US007655321B2

(12) United States Patent
Albrecht et al.

(10) Patent No.: US 7,655,321 B2
(45) Date of Patent: Feb. 2, 2010

(54) COMPONENT HAVING A COATING

(75) Inventors: Anton Albrecht, Andechs-Erling (DE); Thomas Cosack, Windach (DE); Thomas Dautl, Weichs (DE); Horst Pillhoefer, Roehrmoos (DE)

(73) Assignee: MTU Aero Engines GmbH, Munich (DE)

( * ) Notice: Subject to any disclaimer, the term of this patent is extended or adjusted under 35 U.S.C. 154(b) by 276 days.

(21) Appl. No.: 11/210,034

(22) Filed: Aug. 23, 2005

(65) Prior Publication Data

US 2008/0166589 A1 Jul. 10, 2008

(30) Foreign Application Priority Data

Aug. 2, 2005 (DE) ........................ 10 2005 036 162

(51) Int. Cl.
*B32B 15/00* (2006.01)
*B32B 15/01* (2006.01)
*C25D 7/00* (2006.01)

(52) U.S. Cl. ........................ 428/632; 428/633; 428/650; 428/652; 428/670; 416/241 R

(58) Field of Classification Search ................. 428/632, 428/633, 650, 652, 670, 680, 610; 416/241 R
See application file for complete search history.

(56) References Cited

U.S. PATENT DOCUMENTS

| | | | | |
|---|---|---|---|---|
| 5,500,252 | A * | 3/1996 | Meelu | 427/376.3 |
| 5,514,482 | A | 5/1996 | Strangman | 428/623 |
| 5,897,966 | A * | 4/1999 | Grossklaus et al. | 428/652 |
| 6,340,500 | B1 * | 1/2002 | Spitsberg | 427/250 |
| 6,589,668 | B1 | 7/2003 | Braithwaite et al. | 428/610 |
| 7,229,701 | B2 * | 6/2007 | Madhava et al. | 428/678 |
| 2003/0203221 | A1 * | 10/2003 | Spitsberg | 428/469 |
| 2007/0231586 | A1 | 10/2007 | Albrecht et al. | 428/457 |

FOREIGN PATENT DOCUMENTS

| | | |
|---|---|---|
| DE | 103 36 989 | 3/2003 |
| EP | 1 273 681 | 1/2001 |
| EP | 0 784 104 B1 | 5/2001 |
| EP | 1 123 987 | 8/2001 |
| EP | 1 528 116 | 5/2005 |
| WO | WO 96/13622 | 5/1996 |
| WO | WO 2005/052211 | 6/2005 |

OTHER PUBLICATIONS

Search Report of EP 1 754 801 & brief translation (3 pages).

* cited by examiner

*Primary Examiner*—Timothy M Speer
*Assistant Examiner*—Gordon R Baldwin
(74) *Attorney, Agent, or Firm*—Davidson, Davidson & Kappel, LLC

(57) ABSTRACT

A component having a corrosion-resistant and/or oxidation-resistant coating is provided that includes at least one platinum-aluminum substrate area is provided, the component having a substrate surface (11) and a substrate composition based on nickel, with a platinum-aluminum substrate area (12) formed in the area of the substrate surface of the component by precipitating platinum (Pt) and aluminum (Al) on the substrate surface. The platinum-aluminum substrate area (12) has a two-phase structure or duplex structure with finely dispersed platinum-aluminum deposits in a nickel-based mixed crystal in an outer zone (13), and a single-phase structure made of a nickel-based mixed crystal in an inner zone (14) located between the substrate surface (11) of the component and the outer zone (13).

2 Claims, 2 Drawing Sheets

COMPONENT HAVING A COATING

This application claims priority to German Patent Application Serial No. DE 10 2005 036 162.5, filed Aug. 2, 2005, the entire disclosure of which is incorporated by reference herein.

FIELD OF THE INVENTION

The present invention relates to a component having a corrosion-resistant and/or oxidation-resistant coating that includes at least one platinum-aluminum substrate area. In addition, the present invention relates to a corrosion-resistant and/or oxidation-resistant coating, and a method for producing such a corrosion-resistant and/or oxidation-resistant coating.

BACKGROUND

When components, in particular gas turbine components, are operated at high temperatures, their free surfaces are exposed to highly corrosive and/or oxidizing conditions. When employed in gas turbines, such components may be made for example of a super-alloy based on nickel. To protect them against corrosion and/or oxidation, such components are provided with coatings. To provide a corrosion-resistant and/or oxidation-resistant coating on a component, known methods already precipitate aluminum, and platinum if appropriate, on a substrate surface of the component, to provide a coating in the form of an aluminum substrate area or a platinum-aluminum substrate area. Compared to pure aluminum coatings, platinum-aluminum coatings have the advantage of increased resistance to oxidation and to corrosion from hot gases; such platinum-aluminum coatings are brittle, however, and thus have limited thermal-mechanical strength.

EP 0 784 104 B1 describes a component made of a nickel-based alloy with a platinum-aluminum substrate area, platinum first being precipitated onto a substrate surface of the component and then being diffused into the substrate surface to provide the platinum-aluminum substrate area. After that the component coated with platinum is alitized, in order to provide a platinum-aluminum substrate area that has an integrated aluminum content of 18% by weight to 20% by weight, an integrated platinum content of 18% by weight to 45% by weight, and the remainder components of the substrate composition.

The platinum-aluminum substrate area described in EP 0 784 104 B1, or the component described there having such a coating, has relatively low ductility, which results in limited thermal-mechanical strength (TMS), in particular limited HCF strength and LCF strength. Because of the limited thermal mechanical strength of the platinum-aluminum substrate area described there, cracks can form therein, limiting the durability of the coating.

It is also known from EP 0 784 104 B1 to apply a ceramic layer to the platinum-aluminum substrate area. However, the durability of the ceramic layer on the platinum-aluminum substrate area according to EP 0 784 104 B1 is limited.

Another component having a platinum-aluminum substrate area is known from U.S. Pat. No. 6,589,668 B1, the platinum-aluminum substrate area described there having an inner aluminum diffusion zone and an outer platinum-aluminum zone with a single-phase structure. The coating known from this related art also has limited thermal-mechanical strength, and thus limited durability.

U.S. Pat. No. 5,514,482 should also be referenced as related art, which describes a component onto whose substrate surface an aluminum substrate area of aluminum oxide is deposited, a ceramic layer being applied to this aluminum substrate area including an interposed thin aluminum film. This coating of a component also has limited thermal-mechanical strength, and thus limited durability.

SUMMARY OF THE INVENTION

Against this background, the object of the present invention is to create an innovative component having a corrosion-resistant and/or oxidation-resistant coating, an innovative corrosion-resistant and/or oxidation-resistant coating, and an innovative method for producing a corrosion-resistant and/or oxidation-resistant coating.

This object is achieved by a component having a corrosion-resistant and/or oxidation-resistant coating. In accordance with an embodiment of the present invention a component having a corrosion-resistant and/or oxidation-resistant coating is provided. The component has a substrate surface and a substrate composition based on nickel. A platinum-aluminum substrate area is formed in the area of the substrate surface of the component by precipitating platinum (Pt) and aluminum (Al) on the substrate surface. The platinum-aluminum substrate area has an inner zone and an outer zone, and the inner zone is located between the substrate surface of the component and the outer zone. The platinum-aluminum substrate area has a two-phase structure or duplex structure in the outer zone, and the two-phase structure or duplex structure includes finely dispersed platinum-aluminum deposits in a nickel-based mixed crystal. The platinum-aluminum substrate area has a single-phase structure of a nickel-based mixed crystal in the inner zone.

In accordance with another embodiment of the present invention, a corrosion-resistant and/or oxidation-resistant coating for a component is provided. The coating includes a platinum-aluminum substrate area formed in the area of a substrate surface of the component by precipitating platinum (Pt) and aluminum (Al) on the substrate surface. The platinum-aluminum substrate area has an inner zone and an outer zone, and the inner zone is located between the substrate surface of the component and the outer zone. The platinum-aluminum substrate area has a two-phase structure or duplex structure in the outer zone, and the two-phase structure or duplex structure includes finely dispersed platinum-aluminum deposits in a nickel-based mixed crystal. The platinum-aluminum substrate area has a single-phase structure of a nickel-based mixed crystal in the inner zone.

In accordance with another embodiment of the present invention, a method for producing a corrosion-resistant and/or oxidation-resistant coating is provided, comprising the steps of precipitating platinum onto a surface of a substrate of a component; then diffusing the platinum into the substrate surface; and then an alitizating the substrate, wherein the alitizating further comprises precipitating aluminum thermochemically in a high-activity gas phase process, and thereafter, diffusing aluminum into the substrate surface, such that a platinum-aluminum substrate area is formed that has a two-phase structure or a duplex structure with finely-dispersed platinum-aluminum deposits in a nickel-based mixed crystal in an outer zone, and a single-phase structure made of a nickel-based mixed crystal is formed in an inner zone located between the substrate surface of the component and the outer zone.

As recited in the present invention, the platinum-aluminum substrate area of the corrosion-resistant and/or oxidation-resistant coating of the component includes at least two zones, namely an outer zone having a two-phase structure or duplex structure with finely dispersed platinum-aluminum deposits in a nickel-based mixed crystal, and an inner zone facing the substrate surface, with a single-phase structure made of a nickel-based mixed crystal. The platinum-aluminum substrate area of the present invention has good thermal-mechanical strength, and thus provides effective and durable oxidation protection and corrosion protection, even at high temperatures and under high mechanical stress. In addition, the platinum-aluminum substrate area of the corrosion-resistant and/or oxidation-resistant coating is suitable for effective bonding of a ceramic heat protection layer to the platinum-aluminum substrate area.

Preferably the outer zone of the platinum-aluminum substrate area, having the two-phase structure or duplex structure, has finely dispersed, globulitic $PtAl_2$ deposits between 0.1 μm and 3.0 μm in size in a mixed crystal of β-NiAl, the proportion of the two-phase structure or duplex structure being between 2.0% by volume and 40.0% by volume, and the aluminum proportion in the mixed crystal being greater than 20.0% by weight. In the inner zone of the platinum-aluminum substrate area, the Al proportion in the nickel-based mixed crystal is a maximum of 15.0% by weight and the Pt proportion in the nickel-based mixed crystal is a maximum of 8.0% by weight.

According to an advantageous refinement of the present invention, a ceramic layer is applied to the platinum-aluminum substrate area, an aluminum oxide intermediate layer being formed between the platinum-aluminum substrate area and the ceramic layer. Preferably, the ceramic layer is in the form of a zirconium oxide layer, the $Al_2O_3$ intermediate layer having a proportion of at least 90.0% by volume of alpha $Al_2O_3$ with a rhombohedral crystal lattice structure and a proportion of no more than 10.0% by volume of gamma $Al_2O_3$ with a cubic crystal lattice structure, and the zirconium oxide layer including a proportion of no more than 8.0% by weight of yttrium oxide.

BRIEF DESCRIPTION OF THE DRAWINGS

Exemplary embodiments of the present invention will be explained in greater detail on the basis of the following drawings, but are not limited thereto.

DETAILED DESCRIPTION

Embodiments of the present invention will be described in greater detail below, with reference to FIGS. 1 through 3.

Figure 1:
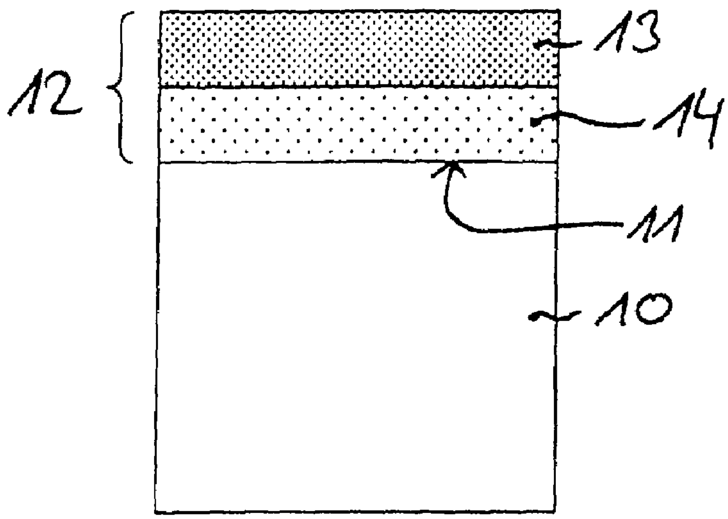
FIG. 1 shows a highly schematic section of a component according to the present invention, having a corrosion-resistant and/or oxidation-resistant coating that includes a platinum-aluminum substrate area, according to a first exemplary embodiment of the present invention.

FIG. 1 shows a schematic cross section of a component 10 according to the present invention, a corrosion-resistant and oxidation-resistant coating in the form of a platinum-aluminum substrate area 12 being deposited onto substrate surface 11. Component 10 has a substrate composition based on nickel, preferably over a directionally solidified or monocrystalline substrate composition having a nickel proportion between 18.0% by weight and 48.0% by weight and an aluminum proportion between 1.0% by weight and 8.0% by weight. Platinum-aluminum substrate area 12 is applied to substrate surface 11 of component 10 in such a way that it forms two zones, namely an outer zone 13 and an inner zone 14 located between outer zone 13 and substrate surface 11 of component 10. As recited in the present invention, outer zone 13 has a two-phase structure or duplex structure with finely dispersed platinum-aluminum deposits in a nickel-based mixed crystal. Inner zone 14 on the other hand is a diffusion zone and has a single-phase structure made of a nickel-based mixed crystal.

Outer zone 13, having the two-phase structure or duplex structure, has finely dispersed, globulitic $PtAl_2$ deposits between 0.1 μm and 3.0 μm in size in a mixed crystal of β-NiAl, the proportion of the two-phase structure or duplex structure being between 2.0% by volume and 40.0% by volume, and the aluminum proportion in the mixed crystal being greater than 20.0% by weight. In inner zone 14 the Al proportion in the nickel-based mixed crystal is a maximum of 15.0% by weight and the Pt proportion in the nickel-based mixed crystal is a maximum of 8.0% by weight. Yttrium and/or hafnium may be present both in outer zone 13 and in inner diffusion zone 14 of the platinum-aluminum substrate area, the maximum yttrium proportion being 1.5% by weight and/or the maximum hafnium proportion also being 1.5% by weight in both zones 13 and 14.

Preferably, the size of the $PtAl_2$ deposits is between 0.1 μm and 1.0 μm in outer zone 13 of platinum-aluminum substrate area 12, the proportion of the two-phase structure or duplex structure is between 2.0% by volume and 20.0% by volume, and the proportion of aluminum in the mixed crystal is greater than 25% by weight. In inner diffusion zone 14 the maximum proportion of aluminum is preferably 10.0% by weight and the maximum proportion of platinum is 1.0% by weight, while in an especially preferred embodiment the maximum proportion of platinum in inner diffusion zone 14 of platinum-aluminum substrate area 12 is 0.1% by weight.

To produce component 10 shown in FIG. 1 with platinum-aluminum substrate area 12, the procedure in a concrete exemplary embodiment is that a component 10 having a substrate composition in the form of a nickel-based alloy is prepared in a first step.

Component 10 may be for example a rotor blade of a gas turbine made of a monocrystalline nickel-based alloy of type SC 2000, which includes over 5.0% by weight of cobalt, 10.0% by weight of chromium, 5.0% by weight of aluminum, 1.5% by weight of titanium, 12.0% by weight of tantalum, 4.0% by weight of tungsten, and a remainder of nickel.

In a second step prepared component 10 is then cleaned in the area of substrate surface 11, preferably by abrasive blasting with an aluminum oxide abrasive which has a particle size between 5 μm and 150 μm, preferably between 45 μm and 75 μm. The abrasive blasting takes place preferably in a multiple-jet blasting facility at a pressure of between 2 bar and 5 bar, preferably at a pressure of 3 bar, where a degree of overlap of the abrasive blasting is between 400% and 1000%, preferably 800%. In this process a layer thickness between 5 μm and 10 μm is removed from substrate surface 11 by abrasion.

Following the abrasive blasting or cleaning of substrate surface 11 of component 10, platinum is precipitated onto the cleaned substrate surface 11 of component 10, a platinum layer thickness between 1 μm and 10 μm, preferably between 2 μm and 4 μm, forming here.

Following precipitation of the platinum onto substrate surface 11 of component 10, the platinum is diffused into the substrate surface, the diffusing preferably being carried out as diffusing annealing at a temperature between 960° C. and 1,160° C., preferably at a temperature between 1000° C. and 1,100° C. The holding period of the diffusion annealing to diffuse the platinum into substrate surface 11 is relatively short, i.e., between 5 minutes and 60 minutes, preferably between 5 minutes and 15 minutes.

In an additional step of the method according to the present invention, aluminum is then precipitated onto platinum-coated substrate surface 11. Aluminum is precipitated thermochemically in a high-activity gas phase process in an atmosphere of aluminum monohalogenides, the proportion of aluminum monohalogenides in the atmosphere being at least 15% by volume, the pressure during precipitation being 10 mbar to 800 mbar above normal pressure or ambient pressure, and the temperature being between 950° C. and 1,140° C.

Following the precipitation of the aluminum, the aluminum is diffused at an activity level of at least 50 atom percent in relation to pure nickel, the diffusing taking place at a temperature that is at least 10° C. lower than the annealing temperature of the platinum, and the holding period for diffusing the aluminum being between 180 minutes and 360 minutes, preferably between 210 minutes and 330 minutes. Platinum-aluminum substrate area 12 is formed, with a thickness of approximately 60 μm.

Using the above method, platinum-aluminum substrate area 12 shown in FIG. 1 may be prepared with zones 13 and 14, platinum-aluminum substrate area 12 having high oxidation resistance and corrosion resistance, even at high temperatures, and excellent thermal mechanical strength, in particular excellent HCF strength and LCF strength. The coating of the present invention, produced using the method according to the present invention from the platinum-aluminum substrate area 12 shown in FIG. 1, accordingly has good durability on component 10.

Figure 2:
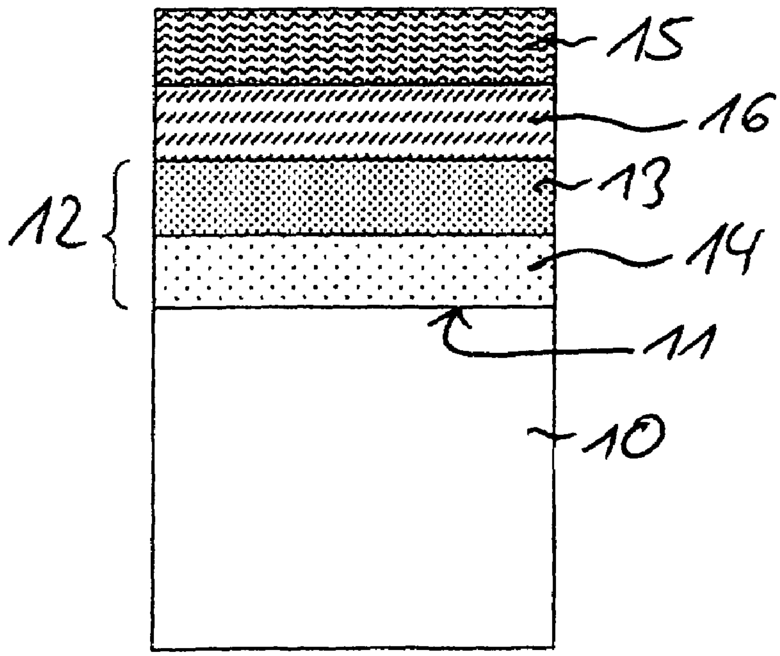
FIG. 2 shows a highly schematic section of a component according to the present invention, having a corrosion-resistant and/or oxidation-resistant coating that includes a platinum-aluminum substrate area, a ceramic layer and an intermediate layer, according to a second exemplary embodiment of the present invention.

FIG. 2 shows a second exemplary embodiment of a component according to the present invention having a corrosion-resistant and/or oxidation-resistant coating, the exemplary embodiment in FIG. 2 showing component 10 including a ceramic layer 15 in addition to platinum-aluminum substrate area 12, which is deposited onto substrate surface 11 of component 10 and has the two zones 13 and 14, an aluminum oxide intermediate layer 16 being formed between ceramic layer 15 and outer layer 13 of platinum-aluminum substrate area 12. To avoid unnecessary repetition in describing the component according to FIG. 2, the following only addresses additional layers 15 and 16, and, in regard to platinum-aluminum substrate area 12 having zones 13 and 14, reference is made to the explanations regarding the exemplary embodiment in FIG. 1.

Aluminum oxide intermediate layer 16, which adjoins outer zone 13 of platinum-aluminum substrate area 12, is implemented as an $Al_2O_3$ intermediate layer, and has a proportion of at least 90.0% by volume of alpha $Al_2O_3$ with a rhombohedral crystal lattice structure and a proportion of no more than 10.0% by volume of gamma $Al_2O_3$ with a cubic crystal lattice structure, the crystal lattice structures having similar lattice sizes. The maximum deviation of the lattice sizes of the crystal lattice structure is approximately 2%.

Ceramic layer 15, which is in the form of a zirconium oxide layer having a maximum proportion of 8.0% by weight of yttrium oxide, is deposited onto this aluminum oxide intermediate layer 16. Ceramic layer 15 has a columnar structure and a cubic-tetragonal crystal lattice, ceramic layer 15 adhering very well to aluminum oxide intermediate layer 16.

The thickness of aluminum oxide intermediate layer 16 is between 0.02 μm and 0.8 μm, and the thickness of ceramic layer 15 is between 100 μm and 200 μm. Within ceramic layer 15, which has a laminar columnar structure, the minimum ratio of height to width of the columns is 10, the length of the columns being between 0.05 μm and 0.5 μm.

The component according to the present invention as shown in FIG. 2 and having the corrosion-resistant and oxidation-resistant coating according to the present invention is produced according to a concrete exemplary embodiment by preparing in a first step as the component, for example, a rotor blade of a gas turbine, from a directionally hardened nickel-based alloy material, for example from nickel-based alloy Rene 142 with 12.0% by weight of cobalt, 6.8% by weight of chromium, 6.1% by weight of aluminum, 6.3% by weight of tantalum, 1.5% by weight of molybdenum, 5.0% by weight of tungsten, 1.5% by weight of hafnium, 2.8% by weight of rhenium and a remainder of nickel.

After such a component 10 is prepared, substrate surface 11 made thereof is cleaned, preferably by abrasive blasting using corundum with a particle size between 20 μm and 100 μm at a pressure of 2.5 bar and a degree of overlap in a multiple-jet blasting facility of preferably 800%±200%. In this process a layer thickness between 3 μm and 10 μm is removed from substrate surface 11 by abrasion.

Following the cleaning of substrate surface 11, platinum with a layer thickness of preferably 2 μm to 4 μm is precipitated onto substrate surface 11, and following the platinum precipitation, platinum is diffused at a temperature of approximately 1,080° C. and at a holding time of approximately 15 minutes.

After this platinum coating of the substrate surface, aluminum is precipitated as in the exemplary embodiment of FIG. 1, using a high-activity gas phase process with an atmosphere of aluminum monohalogenide, the proportion of aluminum monohalogenide in the atmosphere being at least 15% by volume. Next the aluminum is diffused at a minimum aluminum activity level of 50 atom %, again in relation to pure nickel, preferably at a temperature of 1,040° C. and at a holding time of 330 minutes. A platinum-aluminum substrate area 12 with a thickness of approximately 60 μm then forms, the proportion of the two-phase structure or duplex structure in outer zone 30 of platinum-aluminum substrate area 12 being approximately 15% by volume and the finely dispersed, globulitic $PtAl_2$ deposits having a size of approximately 0.3 μm.

After platinum-aluminum substrate area 12 is prepared, platinum-aluminum substrate area 12 is cleaned by abrasive blasting to form aluminum oxide intermediate layer 16, a layer thickness of approximately 2 μm being removed during the mechanical abrasive blasting of outer zone 13 of platinum-aluminum substrate area 12. The thickness of the removed layer here may be between 0.5 μm and 8 μm, preferably between 1 μm and 3 μm. The mechanical abrasive blasting is preferably done using aluminum oxide particles with a particle size between 10 μm and 150 μm, preferably between 10 μm and 50 μm. The blasting pressure is under 3 bar, preferably 2.5 bar, the abrasive blasting being performed with a degree of overlap of between 300% and 1,500%, preferably with a degree of overlap of between 300% and 500%.

To form aluminum oxide intermediate layer 16, the component coated with platinum-aluminum substrate area 12 and cleaned undergoes a thermo-oxidative treatment by heating it under a high vacuum at a pressure of approximately 14 mbar to a temperature of approximately 900° C., and then holding it at a temperature of between 900° C. and 1,100° C. under low vacuum or partial vacuum at a maximum pressure of $5 \times 10^{-2}$ for about 10 minutes. During this holding in a low vacuum or partial vacuum of preferably $10^{-3}$ mbar, an atmosphere of oxygen and argon or helium prevails, the proportion of oxygen being between 25% by volume and 60% by volume and accordingly the proportion of argon or helium being between 75% by volume and 40% by volume. In this way it is possible to prepare aluminum oxide intermediate layer 16, which is preferably made of pure alpha $Al_2O_3$.

Following the formation of aluminum oxide intermediate layer 16, ceramic layer 15 is deposited onto aluminum oxide intermediate layer 16 by precipitating zirconium oxide $Zr_2O_3$ with a maximum proportion of 8.0% by weight of yttrium oxide ($Y_2O_3$). Ceramic layer 15 is precipitated under thermal oxidizing conditions, a temperature between 900° C. and 1,100° C. being held for a predetermined time of approximately 15 minutes at a low vacuum or partial vacuum. An atmosphere of oxygen and argon and helium prevails, the proportion of oxygen being between 25% by volume and 60% by volume.

The ceramic layer is vapor-deposited with an oscillating and/or wobbling motion of component 11 in a vapor cone of the ceramic material. Ceramic layer 15 may also be precipitated as a sol-gel process or CVD process or PVD process.

Figure 3:
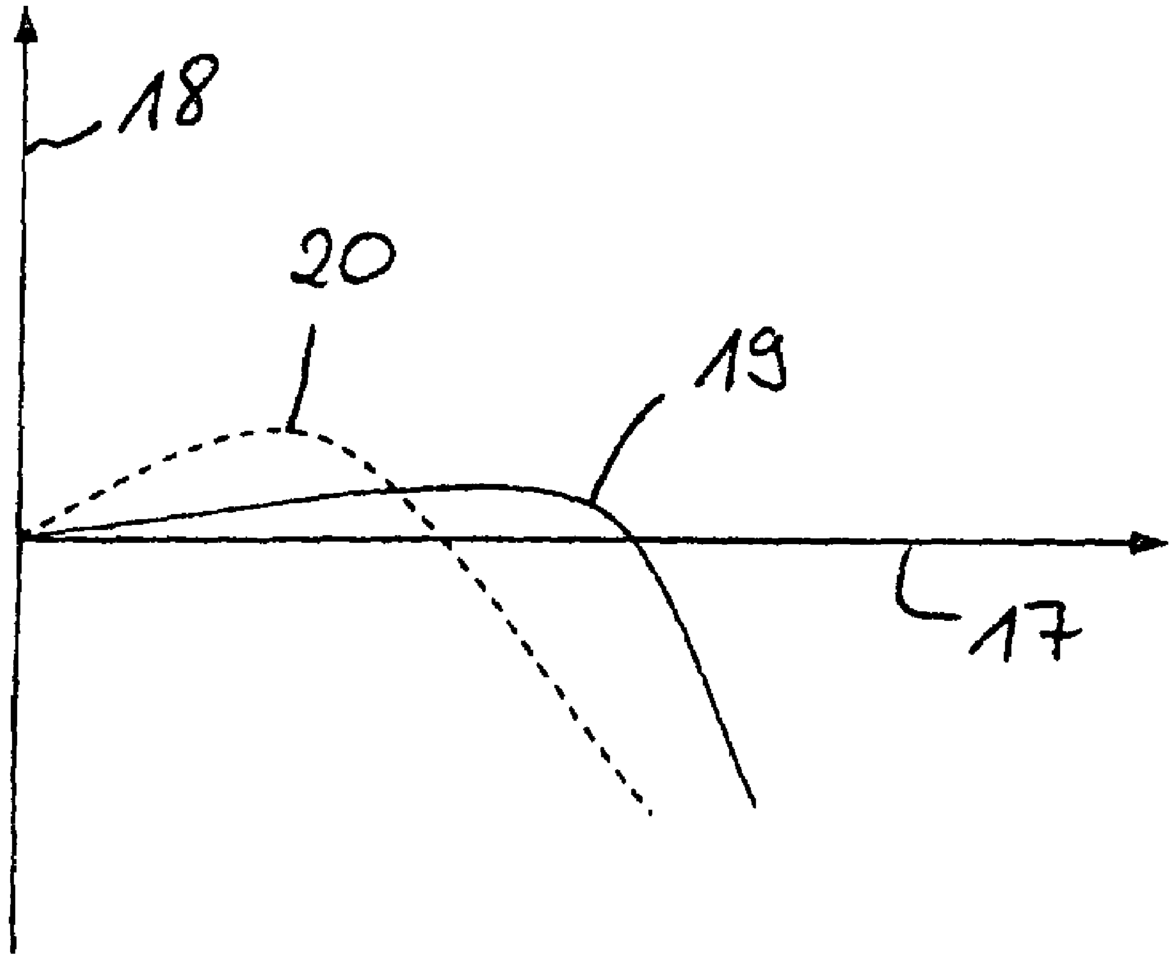
FIG. 3 shows a diagram to clarify the properties of the corrosion-resistant and/or oxidation-resistant coating according to the present invention.

FIG. 3 shows the good durability of platinum-aluminum substrate area 12, and thus of the entire corrosion-resistant and/or oxidation-resistant coating on component 10 using the example of a diagram, the experimental time or process time being plotted on horizontal axis 17 and a weight change of a coated component according to the present invention being plotted on a vertical axis 18. Curve 19 shown in FIG. 3 as a solid line corresponds to a coated component according to the present invention, and curve 20 shown with a dashed line corresponds to a component according to the related art. Hence it can be seen from FIG. 3 that the weight of the coated component according to the present invention increases relatively slowly and relatively slightly at the beginning of the testing time, from which it may be concluded that oxidation begins relatively slowly on the coated component according to the present invention. Furthermore, an increase in weight begins relatively late compared to the related art, which leads to the conclusion that the coating remains on the component relatively long compared to the related art, so that the coating does not begin to flake off until relatively late. The result is that a coated component according to the present invention exhibits improved oxidation and corrosion properties compared to the related art, and also has improved durability.

REFERENCE NUMERALS

10 component
11 substrate surface
12 platinum-aluminum substrate area
13 outer zone
14 inner zone
15 ceramic layer
16 intermediate layer
17 curve
18 curve
19 axis
20 axis

The invention claimed is:

1. A component having a corrosion-resistant and/or oxidation-resistant coating, comprising a component having a substrate composition based on nickel, the component having a substrate surface;

a platinum-aluminum substrate area formed by precipitating platinum (Pt) and aluminum (Al) on the substrate surface, the platinum-aluminum substrate area having an inner zone and an outer zone, wherein:

the outer zone including a two-phase structure or duplex structure including finely dispersed platinum-aluminum deposits in a nickel-based mixed crystal, and the inner zone including a single-phase structure of a nickel-based mixed crystal, and the inner zone is located between the substrate surface of the component and the outer zone, wherein the outer zone having the two-phase structure or duplex structure has finely dispersed, globulitic $PtAl_2$deposits between 0.1 μm and 3.0 μm in size in a mixed crystal of β-NiAl, the proportion of the two-phase structure or duplex structure being between 2.0% by volume and 40.0% by volume of the outer zone, and the aluminum proportion in the mixed crystal being greater than 20.0% by weight.

2. The component as recited in claim 1, wherein the outer zone having the two-phase structure or duplex structure has finely dispersed, globulitic PtAl2 deposits between 0.1 μm and 1.0 μm in size in a mixed crystal of β-NiAl, the proportion of the two-phase structure or duplex structure being between 2.0% by volume and 20.0% by volume of the outer layer, and the Al proportion in the mixed crystal being greater than 25.0% by weight.

* * * * *